United States Patent
Lee et al.

(10) Patent No.: US 11,461,126 B2
(45) Date of Patent: Oct. 4, 2022

(54) ELECTRONIC DEVICE AND METHOD FOR EXCHANGING DATA AMONG ENTERPRISE MANAGEMENT SYSTEMS

(71) Applicant: Goldtek Technology Co., Ltd., New Taipei (TW)

(72) Inventors: Yen-Ching Lee, New Taipei (TW); Chun-Chi Chen, New Taipei (TW); Po-Sheng Wang, New Taipei (TW); Chih-Yung Chang, New Taipei (TW)

(73) Assignee: Goldtek Technology Co., Ltd., New Taipei (TW)

( * ) Notice: Subject to any disclaimer, the term of this patent is extended or adjusted under 35 U.S.C. 154(b) by 426 days.

(21) Appl. No.: 16/665,293

(22) Filed: Oct. 28, 2019

(65) Prior Publication Data
US 2021/0026681 A1    Jan. 28, 2021

(30) Foreign Application Priority Data

Jul. 22, 2019   (TW) ................................. 108125885

(51) Int. Cl.
*G06F 9/46*     (2006.01)
*G06F 16/248*   (2019.01)
*G06F 16/2455*  (2019.01)
*G06F 9/48*     (2006.01)

(52) U.S. Cl.
CPC ............ *G06F 9/466* (2013.01); *G06F 9/4887* (2013.01); *G06F 16/248* (2019.01); *G06F 16/2455* (2019.01)

(58) Field of Classification Search
CPC ............................... G06F 9/466; G06F 9/4887
See application file for complete search history.

*Primary Examiner* — Gregory A Kessler
(74) *Attorney, Agent, or Firm* — ScienBiziP, P.C.

(57) ABSTRACT

A method for exchanging data among several enterprise management systems includes receiving and processing data sent by a first system, and recording a task of writing data to a second system in a database of an electronic device, and setting the recorded task as unfinished task. A list of unfinished tasks is acquired from the database in predetermined time period, and a result of query can be generated by searching or interrogating the second system as to the list of unfinished tasks. When the second system has finished the task, the task for writing data in the second system is set as finished.

20 Claims, 3 Drawing Sheets

ELECTRONIC DEVICE AND METHOD FOR EXCHANGING DATA AMONG ENTERPRISE MANAGEMENT SYSTEMS

CROSS-REFERENCE TO RELATED APPLICATIONS

This application claims priority to Taiwanese Patent Application No. 108125885 filed on Jul. 22, 2019, the contents of which are incorporated by reference herein.

FIELD

The subject matter herein generally relates to systems management technology.

BACKGROUND

Modern enterprises have introduced a variety of management systems. For example, an Enterprise Resource Planning system (ERP), a Supply Chain management system, a Customer Relationship Management system, and a Product Lifecycle Management (PLM) system. These management systems have their own service objects and scope, but at the same time there are many intersections, which require a large amount of information transfer between systems, especially between the ERP system and the PLM system. The efficiency and accuracy of such information transfers needs to be improved.

BRIEF DESCRIPTION OF THE DRAWINGS

Many aspects of the disclosure can be better understood with reference to the following drawings. The components in the drawings are not necessarily drawn to scale, the emphasis instead being placed upon clearly illustrating the principles of the disclosure. Moreover, in the drawings, like reference numerals designate corresponding parts throughout the several views.

DETAILED DESCRIPTION

Figure 1:
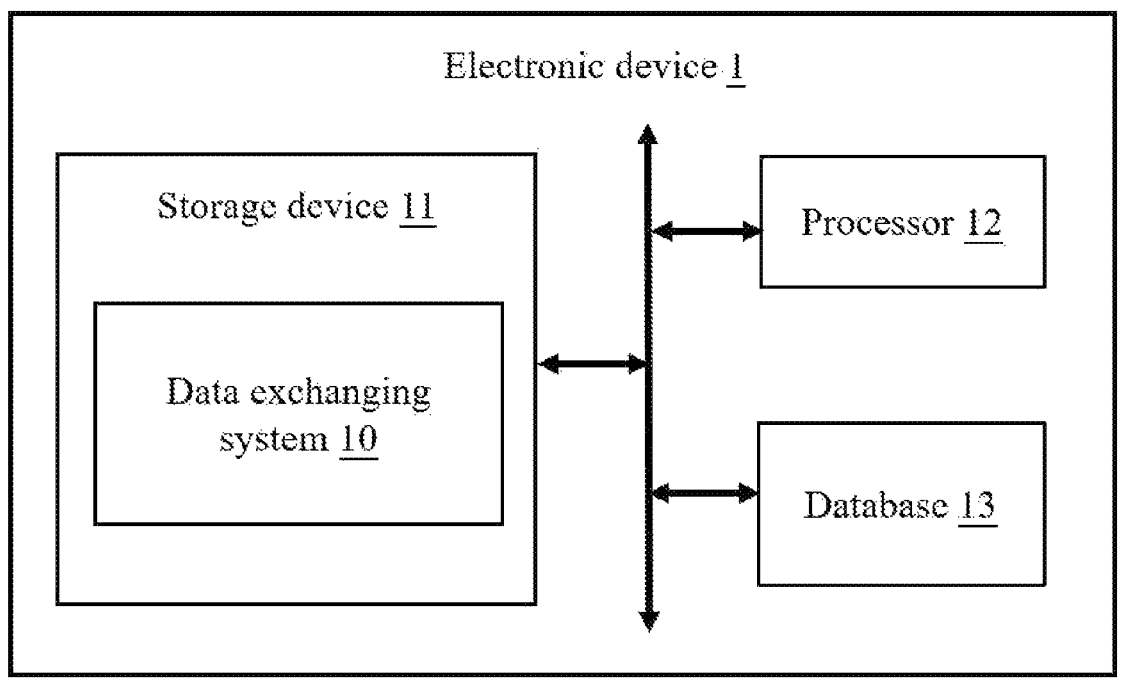
FIG. 1 is a block diagram of one embodiment of an electronic device.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

The present disclosure, including the accompanying drawings, is illustrated by way of examples and not by way of limitation. It should be noted that references to "an" or "one" embodiment in this disclosure are not necessarily to the same embodiment, and such references mean "at least one."

The term "module", as used herein, refers to logic embodied in hardware or firmware, or to a collection of software instructions, written in a programming language, such as, Java, C, or assembly. One or more software instructions in the modules can be embedded in firmware, such as in an EPROM. The modules described herein can be implemented as either software and/or hardware modules and can be stored in any type of non-transitory computer-readable medium or other storage device. Some non-limiting examples of non-transitory computer-readable media include CDs, DVDs, BLU-RAY™, flash memory, and hard disk drives. The term "comprises" means "including, but not necessarily limited to"; it specifically indicates open-ended inclusion or membership in a so-described combination, group, series, and the like.

FIG. 1 shows one embodiment of an electronic device (electronic device 1). In at least one embodiment, a data exchanging system 10 can be operated in the electronic device 1. The electronic device 1 can include, but is not limited to, a storage device 11, at least one processor 12, a computer program stored in the storage device 11 and capable of running on the at least one processor 12, at least one communication bus, and a database 13.

In at least one embodiment, the at least one processor 12 can implement steps in the embodiment of method for exchanging data as detailed below when the computer program is executed.

In at least one embodiment, the database 13 is a repository in the electronic device 1 that organizes, stores, and manages data according to a data structure. The database can include a hierarchical database, a networked database, and a relational database. In the present embodiment, the database 13 can be used to store information such as tasks for writing data to a second system.

In at least one embodiment, the computer program can be partitioned into one or more modules/units that are stored in the storage device 11 and executed by the at least one processor 12 to complete the present invention. The one or more modules/units may be a series of computer program instruction segments capable of performing a particular function, the instruction segments being used to describe the execution of the computer program in the electronic device 1.

In at least one embodiment, the electronic device 1 can include, but is not limited to, an electronic device such as a smart phone, a tablet computer, a desktop computer, or an all-in-one computer. It can be understood by those skilled in the art that the FIG. 1 is only an example of the electronic device 1, does not constitute a limitation on the electronic device 1, and may include more or less components than those illustrated, or combine some components, or different. The components, such as the electronic device 1, may also include circuitry, I/O interfaces, batteries, operating systems, and the like.

Although not shown, the electronic device 1 may further include other components such as a WI-FI unit, a BLUETOOTH unit, a speaker, and the like, and details are not described herein.

Figure 2:
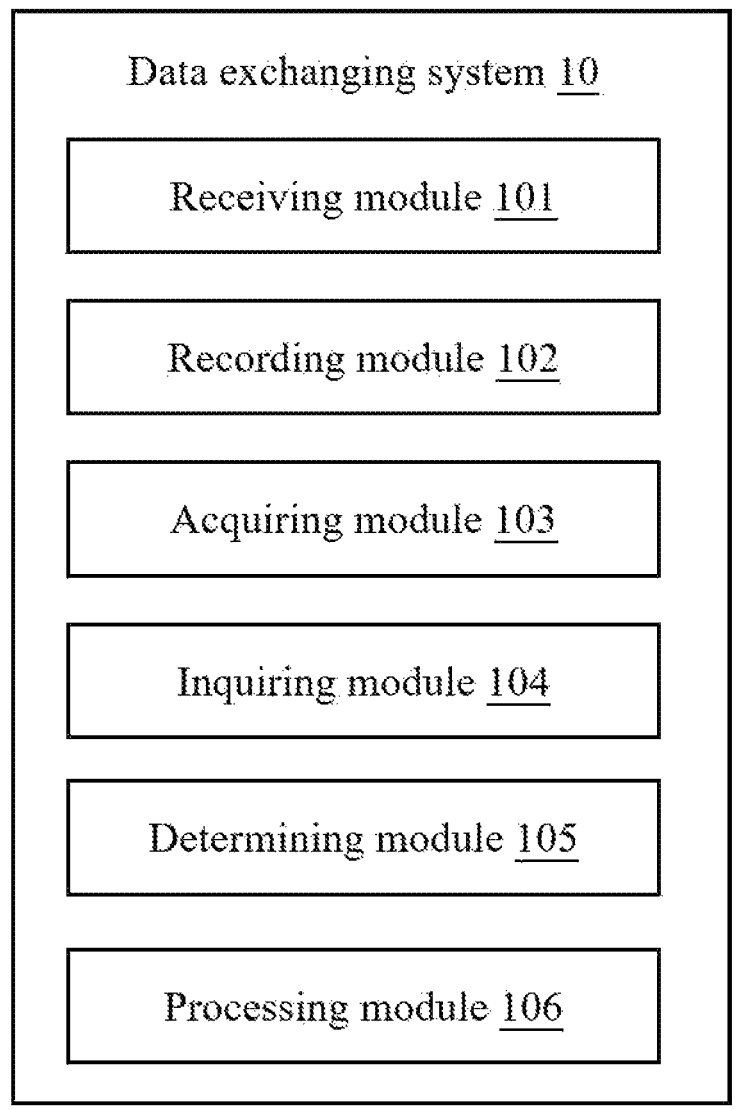
FIG. 2 illustrates a flowchart of one embodiment of a method for exchanging data applied in the electronic device of FIG. 1.

FIG. 2 illustrates a flowchart of one embodiment of a method for linking enterprise management systems, the method can be applied in the electronic device of FIG. 1. In an example embodiment, the method is performed by execution of computer-readable software program codes or instructions by the processor 10 of the electronic device 1.

Referring to FIG. 2, the method is an example, as there are a variety of ways to carry out the method. The method described below can be carried out using the configurations illustrated in FIG. 1, for example, and various elements of these figures are referenced in explaining the method. Each block shown in FIG. 2 represents one or more processes, methods, or subroutines, carried out in the method. Furthermore, the illustrated order of blocks is illustrative only and the order of the blocks can be changed. Additional blocks can be added or fewer blocks can be utilized without departing from this disclosure. The example method can begin at block S01.

At block S01, the data exchanging system 10 can receive a request from a first system to write data.

In at least one embodiment, the first system can be a Product Lifecycle Management (PLM) system or a Product Data Management (PDM) system. The PLM system enables all of the people who are involved in creating, communicating, and maintaining product design to freely share and deliver all data related to the product throughout the product lifecycle, such as paper and digital documents, CAD files, and product structures. Therefore, when the data of each system in the enterprise management systems is exchanged, the data in the PLM system is usually used as the data source.

In at least one embodiment, the method for exchanging data between enterprise management systems is configured to notify the second system that the first system is initiating an event to implement data exchange between the first system and the second system. The second system can be an Enterprise Resource Planning system (ERP) system. For example, the PLM system can send the request to the ERP system to write data to the ERP system. A data exchanging mode between the PLM system and the data exchanging system 10 can be a one-way or two-way transport mode.

In at least one embodiment, the PLM system can send data to the data exchanging system 10 by asynchronous transmission, and the data exchanging system 10 can receive the request from the PLM system for writing data. The PLM system then enters a state of waiting for a notification. The notification can be if and when the ERP system has processed the data.

In at least one embodiment, the data can include parts information and bill of material (BOM) information. The parts information can include number of parts, names of parts, parts in units, homemade versions of parts, details of parts, and purchase properties, such as the effective date information. The BOM information can include engineering bill of materials (EBOM) and manufacturing bill of materials (MBOM).

In at least one embodiment, the data exchanging method further can include a step for writing the request into a message queue.

In at least one embodiment, the data exchanging system 10 can supply a message queue interface for handling tasks sent by the PLM system, the tasks being writing data.

At block S02, the data exchanging system 10 can receive and process the data sent by the first system.

In at least one embodiment, when the data exchanging system 10 receives a data-writing task from the first system, the data exchanging system 10 can receive the data sent by the first system and send the task to the first system, and the first system can perform the data writing.

In at least one embodiment, the received data may be processed by pre-stored processing rules to obtain data required by the second system. The pre-stored processing rules are relevant to the received data. For example, when the received data are types of product, the pre-stored processing rules can include rules for product structure building and parametric rules for details of parts.

At block S03, the data exchanging system 10 can record the data-writing task to the second system in the data base 13, and set the recorded task as an unfinished task.

In at least one embodiment, the second system can be an ERP system. As the ERP system needs time to process the data, the ERP system cannot feed back a response to the data exchanging system 10 in real time. The response will be data-write finished. Then, the data exchanging system 10 can record the data-writing task to the ERP system for informing the ERP system to process the task in time.

At block S04, the data exchanging system 10 can acquire a list of unfinished tasks from the database 13 in predetermined time period.

In at least one embodiment, the data exchanging system 10 can verify whether the second system has completed the data-writing task, and provide timely feedback to the first system. For example, when the second system has not completed the data-writing task, the second system can send an unresponsive information to the data exchanging system 10. The data exchanging system 10 can collect all unresponsive information from the database 13, and establish the list according to all unresponsive information.

At block S05, the data exchanging system 10 can generate a query result by inquiring the second system according to the list of the unfinished tasks.

In at least one embodiment, the data exchanging system 10 can separately query the ERP system according to the list of unfinished tasks to process the data-writing task. When the ERP system generates a result after finishing the data-writing task, the data exchanging system 10 can inform the PLM system by transferring to the PLM system such result of the ERP system. If the ERP system has not finished the data-writing task, the data exchanging system 10 can confirm the data-writing task in the next validation.

In at least one embodiment, the data exchanging system 10 can generate the query result by polling the second system in turn according to the list of unfinished tasks.

In other embodiments, the data exchanging system 10 can generate the result of query by making multi-thread inquiries of the second system. The multithreading method improves efficiency.

The step of generating the query result by inquiring the second system according to the list of unfinished tasks can include:

(1) the data exchanging system 10 can start several child threads simultaneously according to the list of unfinished tasks. In at least one embodiment, the data exchanging system 10 can distribute tasks for querying the ERP system. For example, the data exchanging system 10 can divide the list of unfinished tasks into ten subtasks, and can start ten child-threads for simultaneous queries of the ERP system based on the ten individual subtasks.

(2) the data exchanging system 10 can divide a task of querying the second system into several subtasks and send the several subtasks to the several child-threads for execution. For example, the data exchanging system 10 can divide the ten subtasks into the ten child-threads, each of the child-threads performing a single subtask.

In at least one embodiment, the data exchanging method further includes detecting whether an exception event occurs in one of the plurality of child threads. When an exception event occurs in one of the child threads, the data exchanging system 10 can delete the query result of the child thread. When an exception event occurs in one of the child threads, the data exchanging system 10 can terminate the subtasks of other ones of the plurality of child threads.

In at least one embodiment, an exception event occurs when one or more of the child-threads are executing the subtasks, the data exchanging system 10 can capture the exception event and set the subtask as failed. The data exchanging system 10 further can delete query result generated by the child-thread, and close other child-threads which are executing subtasks. The other child-threads executing subtasks refers to all child-threads except for the child-thread in which the exception event occurs.

It is should be noted that when an exception event occurs in any one child thread when querying the second system, the data exchanging system 10 can stop queries to the second system by all the other threads.

At block S06, the data exchanging system 10 can determine whether the second system has finished the data-writing task based on the query result. When the second system has finished the task, the process goes to block S07. When the second system has not finished the task, the process returns to block S04 to reconfirm whether the task of writing the data to the second system is completed.

In at least one embodiment, whether the second system completes the task is determined according to whether the second system returns a completion response to the data exchanging system 10. When the data exchanging system 10 receives the completion response from the second system, it is determined that the task is completed by the second system. Until the data exchanging system 10 receives the completion response from the second system, it is determined that the task is not completed by the second system.

In at least one embodiment, upon the second system finishing the task, that is, the second system has finished writing data sent by the first system, the second system returns a completion response to the data exchanging system 10. The data exchanging system 10 can record the completion response in the message queue. Before the second system finishes the task, that is, the second system has not finished writing data sent by the first system, the second system cannot return the completion response to the data exchanging system 10, and the data exchanging system 10 can stop verifying whether the task is finished. The process returns to block S04, in order that the data exchanging system 10 can reconfirm whether the task of writing the data to the second system is completed.

At block S07, the data exchanging system 10 can set the data-writing task in the second system as being finished, and update a task when the second system has finished the data-writing task. For example, when the second system has finished writing data sent by the first system, the data exchanging system 10 can set the data-writing task in the second system as finished, and update another new data-writing task as unfinished task.

In at least one embodiment, through the above steps S01 to S07, a mechanism for verification of complete exchange of data between the PLM system and the ERP system can be provided, which facilitates data integration between the PLM system and the ERP system, and the speed of data transmission can be realized through such mechanism.

Figure 3:
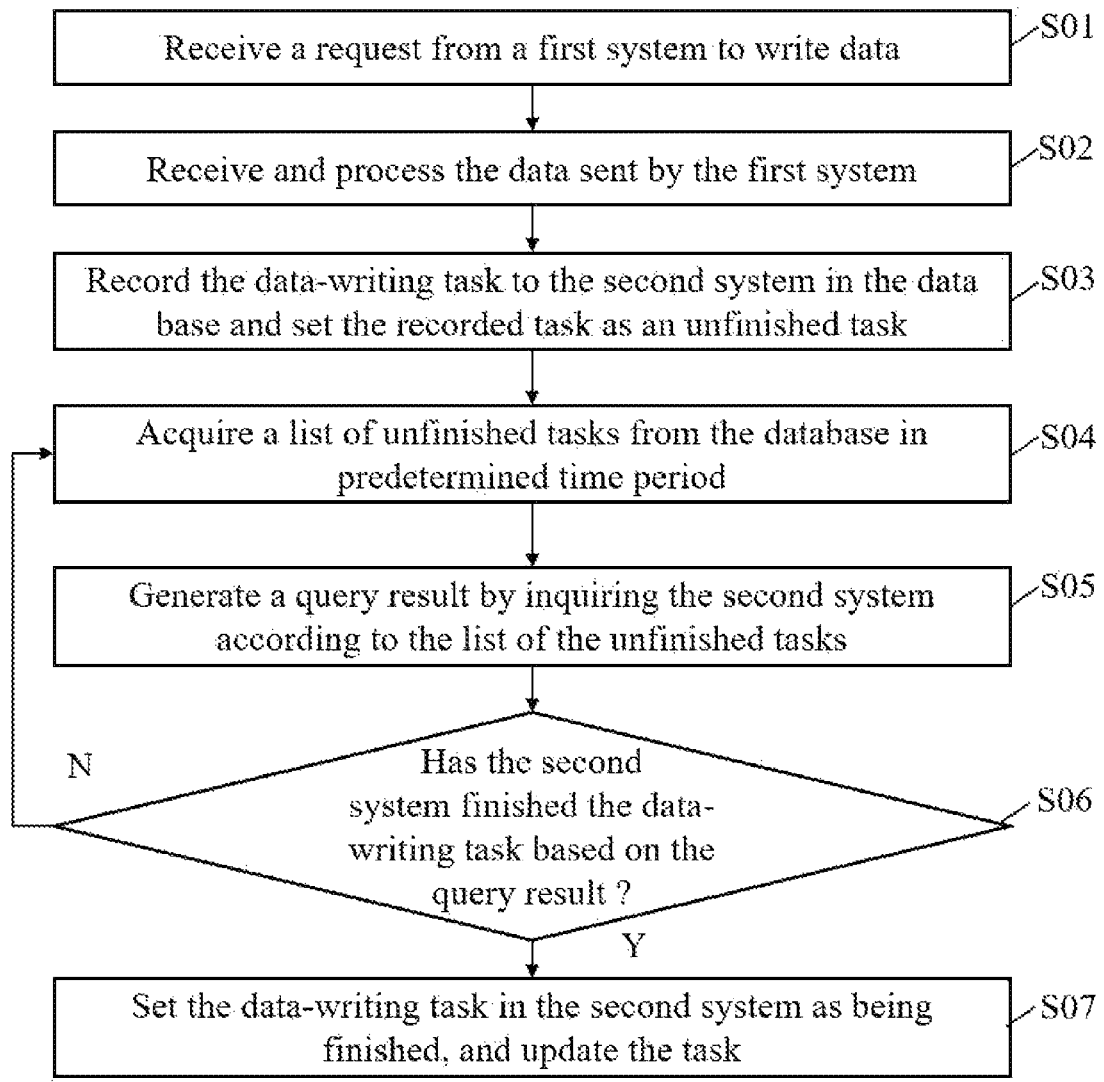
FIG. 3 shows one embodiment of modules of a data exchanging system of the present disclosure.

FIG. 3 shows an embodiment of modules of a data exchanging system of the present disclosure.

In some embodiments, the data exchanging system 10 runs in the electronic device 1. The data exchanging system 10 can include a plurality of modules. The plurality of modules can comprise computerized instructions in a form of one or more computer-readable programs that can be stored in a non-transitory computer-readable medium (e.g., a storage device of the electronic device), and executed by at least one processor of the electronic device to implement data exchanging function (described in detail in FIG. 1).

In at least one embodiment, the data exchanging system 10 can include a plurality of modules. The plurality of modules can include, but is not limited to, a receiving module 101, a recording module 102, an acquiring module 103, an inquiring module 104, a determining module 105, and a processing module 106. The modules 101-106 can comprise computerized instructions in the form of one or more computer-readable programs that can be stored in the non-transitory computer-readable medium (e.g., the storage device of the electronic device), and executed by the at least one processor of the computer device to implement data exchanging function (e.g., as described in detail in FIG. 1).

In at least one embodiment, the receiving module 101 can receive and process the data sent by the first system. The recording module 102 can record the task for writing data to the second system in the database 13, and set the recorded task as an unfinished task. The acquiring module 103 can acquire a list of unfinished tasks from the database 13 in predetermined time period. The inquiring module 104 can generate a result of query by making inquiry of the second system according to the list of unfinished tasks. The determining module 105 can determine whether the second system has finished the task based on the result, and the processing module 106 can set the data-writing task in the second system as finished, and update the task.

The data exchanging system 10 can provide a complete exchanging verification mechanism between the PLM system and the ERP system, which facilitates data integration between the PLM system and the ERP system, and the speed of data transmission can be realized through the exchanging verification mechanism.

In at least one embodiment, the storage device 11 can be an internal storage device, that is, a storage device built into the electronic device 1. In other embodiments, the storage device 11 can also be an external storage device, that is, a storage device external to the electronic device 1.

In some embodiments, the storage device 11 can be used to store program codes and various data, for example, program code of the data exchanging system 10 installed in the electronic device 1. For example, in the present embodiment, the data exchanging system 10 is configured to implement fast and accurate data transmission according to a complete exchanging verification mechanism provided between the PLM system and the ERP system.

In at least one embodiment, the storage device 11 may include a random access memory, and may also include a non-volatile memory such as a hard disk, a memory, a plug-in hard disk, a smart memory card (SMC), and a Secure Digital (SD) card, a Flash Card, at least one disk storage device, a flash memory device, or other volatile solid-state storage device.

In at least one embodiment, the at least one processor 12 can be a central processing unit (CPU). The at least one processor 12 can also be other general-purpose processors, Digital Signal Processors (DSPs), Application Specific Integrated Circuits (ASICs), Field-Programmable Gate Arrays (FPGAs), or other programmable Logic devices, discrete gates or transistor logic devices, discrete hardware components, and more. The general-purpose processor may be a microprocessor or the processor 12 or any other conventional processor or the like.

In some embodiments, when the modules of the data exchanging system 10 are implemented in the form of software functional units and sold or used as separate products, the modules may be stored in a computer readable storage medium. Based on such understanding, the present application implements all or part of such processes in the foregoing embodiments, and may also be completed by a computer program to instruct related hardware. The computer program may be stored in a computer readable storage medium. The steps of the various method embodiments described above may be implemented by a computer program when executed by a processor. The computer program comprises computer program code, which may be in the form of source code, object code form, executable file, or some intermediate form. The computer readable medium may include any entity or device capable of carrying the computer program code, a recording medium, a USB flash drive, a removable hard disk, a magnetic disk, an optical disk, a computer memory, and a read-only memory (ROM).

It should be noted that the division into modules described above is only a logical function division, and the actual implementation may have other manner of division. In addition, each functional module in each embodiment of the present application may be integrated in the same processing unit, or each module may exist physically separately, or two or more modules may be integrated in the same unit. The above integrated modules can be implemented in the form of hardware or in the form of hardware plus software function modules.

It is apparent to those skilled in the art that possible embodiments are not limited to the above-described exemplary embodiments, other specific forms and embodiments are possible without departing from the spirit or essential characteristics. Therefore, the present embodiments are to be considered as illustrative and not restrictive, and the scope of the invention is defined by the appended claims, all changes in the meaning and scope of equivalent elements are included in the application. Any reference signs in the claims should not be construed as limiting the claim. In addition, it is to be understood that the term "comprising" does not exclude other elements neither does the singular exclude the plural. A plurality of units or devices recited in the system claims can also be implemented by a unit or device by software or hardware. Words such as "first", "second", and the like are used to denote names and not to denote any particular order.

It should be emphasized that the above-described embodiments of the present disclosure, including any particular embodiments, are merely possible examples of implementations, set forth for a clear understanding of the principles of the disclosure. Many variations and modifications can be made to the above-described embodiment(s) of the disclosure without departing substantially from the spirit and principles of the disclosure. All such modifications and variations are intended to be included within the scope of this disclosure and protected by the following claims.

What is claimed is:

1. A method for exchanging data between enterprise management systems applied to an electronic device, the method comprising:
   receiving and processing data sent by a first system;
   recording a data-writing task to a second system in a data base of the electronic device, and setting the recorded task as an unfinished task;
   acquiring a list of unfinished tasks from the database in a predetermined time period;
   generating a query result by inquiring the second system according to the list of unfinished tasks;
   determining whether the second system has finished the data-writing task based on the query result; and
   setting the data-writing task in the second system as being finished, and updating a task when the second system has finished the data-writing task.

2. The method according to claim 1, further comprising: receiving a request from the first system to write data.

3. The method according to claim 2, further comprising: writing the request into a message queue.

4. The method according to claim 1, wherein the generating a query result by inquiring the second system according to the list of unfinished tasks comprises:
   starting a plurality of child threads simultaneously according to the list of unfinished tasks; and
   dividing a task of querying the second system into a plurality of subtasks and sending the plurality of subtasks to the plurality of child threads for execution.

5. The method according to claim 4, further comprising:
   detecting whether an exception event occurs in one of the plurality of child threads;
   deleting the query result of the child thread when an exception event occurs in one of the child threads;
   terminating the subtasks of other ones of the plurality of child threads.

6. The method according to claim 1, wherein the determining whether the second system has finished the data-writing task based on the query result comprises:
   determining whether the second system completes the data-writing task according to whether the second system returns a completion response to a data exchanging system;
   determining that the second system completes the data-writing task if the data exchanging system receives the completion response from the second system; and
   determining that the second system does not complete the data-writing task if the data exchanging system does not receive the completion response from the second system.

7. The method according to claim 1, wherein the first system is a product lifecycle management system, and the second system is an enterprise resource planning system.

8. An electronic device comprising:
   a storage device;
   at least one processor; and
   the storage device storing one or more programs, which when executed by the at least one processor, cause the at least one processor to:
   receive and process data sent by a first system;
   record a data-writing task to a second system in a data base of the electronic device, and set the recorded task as an unfinished task;
   acquire a list of unfinished tasks from the database in a predetermined time period;
   generate a query result by inquiring the second system according to the list of unfinished tasks;
   determine whether the second system has finished the data-writing task based on the query result; and
   set the data-writing task in the second system as being finished, and update a task when the second system has finished the data-writing task.

9. The electronic device according to claim 8, wherein the at least one processor is further caused to:
   receive a request from the first system to write data.

10. The electronic device according to claim 9, wherein the at least one processor is further caused to:
    write the request into a message queue.

11. The electronic device according to claim 8, wherein the generate a query result by inquiring the second system according to the list of unfinished tasks comprises:
   start a plurality of child threads simultaneously according to the list of unfinished tasks; and
   divide a task of querying the second system into a plurality of subtasks and send the plurality of subtasks to the plurality of child threads for execution.

12. The electronic device according to claim 11, wherein the at least one processor is further caused to:
   detect whether an exception event occurs in one of the plurality of child threads;
   delete the query result of the child thread when an exception event occurs in one of the child threads;
   terminate the subtasks of other ones of the plurality of child threads.

13. The electronic device according to claim 8, wherein the determine whether the second system has finished the data-writing task based on the query result comprises:
   determine whether the second system completes the data-writing task according to whether the second system returns a completion response to a data exchanging system;
   determine that the second system completes the data-writing task if the data exchanging system receives the completion response from the second system; and
   determine that the second system does not complete the data-writing task if the data exchanging system does not receive the completion response from the second system.

14. The electronic device according to claim 8, wherein the first system is a product lifecycle management system, and the second system is an enterprise resource planning system.

15. A non-transitory storage medium having stored thereon instructions that, when executed by a processor of an electronic device, causes the processor to perform a data exchanging method, the method comprising:
   receiving and processing data sent by a first system;
   recording a data-writing task to a second system in a data base of the electronic device, and setting the recorded task as an unfinished task;
   acquiring a list of unfinished tasks from the database in a predetermined time period;
   generating a query result by inquiring the second system according to the list of unfinished tasks;
   determining whether the second system has finished the data-writing task based on the query result; and
   setting the data-writing task in the second system as being finished, and updating a task when the second system has finished the data-writing task.

16. The non-transitory storage medium according to claim 15, wherein the method further comprises:
   receiving a request from the first system to write data.

17. The non-transitory storage medium according to claim 16, wherein the method further comprises:
   writing the request into a message queue.

18. The non-transitory storage medium according to claim 15, wherein the generating a query result by inquiring the second system according to the list of unfinished tasks comprises:
   starting a plurality of child threads simultaneously according to the list of unfinished tasks; and
   dividing a task of querying the second system into a plurality of subtasks and sending the plurality of subtasks to the plurality of child threads for execution.

19. The non-transitory storage medium according to claim 18, wherein the method further comprises:
   detecting whether an exception event occurs in one of the plurality of child threads;
   deleting the query result of the child thread when an exception event occurs in one of the child threads;
   terminating the subtasks of other ones of the plurality of child threads.

20. The non-transitory storage medium according to claim 15, wherein the determining whether the second system has finished the data-writing task based on the query result comprises:
   determining whether the second system completes the data-writing task according to whether the second system returns a completion response to a data exchanging system;
   determining that the second system completes the data-writing task if the data exchanging system receives the completion response from the second system; and
   determining that the second system does not complete the data-writing task if the data exchanging system does not receive the completion response from the second system.

* * * * *